(12) United States Patent
Liu et al.

(10) Patent No.: US 7,310,206 B2
(45) Date of Patent: Dec. 18, 2007

(54) MAGNETIC THIN FILM HEAD WITH HEAT-ASSISTED WRITE SECTION AND HARD DISK DRIVE INCORPORATING SAME

(75) Inventors: Cheng Yih Liu, Kwai Chung (HK);
Mike Chang, Kwai Chung (HK);
Takehiro Kamigama, Kwai Chung (HK)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 399 days.

(21) Appl. No.: 11/022,927

(22) Filed: Dec. 28, 2004

(65) Prior Publication Data

US 2006/0143635 A1    Jun. 29, 2006

(51) Int. Cl.
*G11B 5/127* (2006.01)
(52) U.S. Cl. ........................... 360/317; 720/659
(58) Field of Classification Search ............. 369/13.01, 369/13.17, 13.24, 112.23; 360/59, 126, 128, 360/317; 359/586; 385/147; 720/659
See application file for complete search history.

(56) References Cited

U.S. PATENT DOCUMENTS

| | | | |
|---|---|---|---|
| 5,295,122 A | | 3/1994 | Murakami et al. |
| 5,576,914 A | | 11/1996 | Rottmayer et al. |
| 6,016,290 A | * | 1/2000 | Chen et al. ............... 369/13.17 |
| 6,754,163 B2 | * | 6/2004 | Kasama et al. ........ 369/112.23 |
| 2001/0017820 A1 | * | 8/2001 | Akiyama et al. ............. 369/13 |
| 2003/0123335 A1 | * | 7/2003 | Rettner et al. ........... 369/13.24 |
| 2005/0052771 A1 | * | 3/2005 | Rausch et al. ................. 360/59 |
| 2005/0135008 A1 | * | 6/2005 | Challener et al. ........... 360/128 |
| 2005/0157393 A1 | * | 7/2005 | Hasegawa et al. .......... 359/586 |
| 2005/0280939 A1 | * | 12/2005 | Sasaki et al. ................ 360/126 |
| 2006/0269218 A1 | * | 11/2006 | Hasegawa et al. .......... 385/147 |

FOREIGN PATENT DOCUMENTS

| | | |
|---|---|---|
| JP | 6-243527 | 9/1994 |
| JP | 2002-117502 | 4/2002 |
| WO | WO 01/97214 | 12/2001 |

* cited by examiner

*Primary Examiner*—Tianjie Chen
(74) *Attorney, Agent, or Firm*—Nixon & Vanderhye P.C.

(57) ABSTRACT

A thin film magnetic read/write head for use in magnetic data storage systems to enable writing of data to a magnetic data storage medium with the assistance of laser heating. The read/write head allows magnetic reading of data from the storage medium, and thermally assisted magnetic writing of data on the storage medium. A waveguide is provided in a write gap in the form of an optical circuit having a plurality of inputs and a single output at the air bearing surface (ABS) for concentrating laser light used for heating the storage medium during the write operation. The thermally assisted magnetic writing improves the thermal stability of the recorded data and usefulness thereof throughout a wide temperature range.

28 Claims, 10 Drawing Sheets

MAGNETIC THIN FILM HEAD WITH HEAT-ASSISTED WRITE SECTION AND HARD DISK DRIVE INCORPORATING SAME

FIELD OF THE INVENTION

The present invention relates in general to data storage systems such as disk drives. More particularly, the present invention relates to a thin film read/write head for use in magnetic data storage systems to enable writing of data to a magnetic data storage medium with the assistance of laser heating. The read/write head of the invention allows magnetic reading of data from the storage medium, and thermally assisted magnetic writing of data on the storage medium. The thermally assisted magnetic writing improves the thermal stability of the recorded data and usefulness thereof throughout a wide temperature range.

BACKGROUND OF THE INVENTION

A conventional magnetic storage system typically includes a thin film magnetic head that includes a slider element and a magnetic read/write element. The head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk, such that a predetermined flying height is maintained over a full radial stroke of the rotary actuator assembly above the surface of the spinning magnetic disk.

Some factors that limit writing (or recording) on a magnetic disk at high data transfer rates (or frequencies) using conventional magnetic heads at wide temperature ranges are the increasing requirements for higher magnetic fields and field gradients to achieve a smaller and smaller bit size. High magnetic fields are difficult to achieve particularly with narrow tracks and miniaturized heads and at low temperature. As a result, thin film magnetic heads incorporating a laser device have been developed and used in magnetic recording devices for heating the magnetic media to reduce the coercive force of the media during the write operation.

One example of a heat-assisted read/write head is shown in U.S. Pat. No. 6,016,290 entitled "Read/Write Head with Shifted Waveguide," which is incorporated by reference herein. FIGS. 1 and 2 of the '290 patent, which are reproduced herein as FIGS. 1 and 2, illustrate an exemplary data storage system and head gimbal assembly, respectively, in which the instant invention may be utilized. More particularly, FIG. 1 illustrates a conventional disk drive 10 including a head stack assembly (HSA) 12 and a stack of spaced apart data storage disks (magnetic recording media) 14 that are rotatable about a common shaft 15. The head stack assembly 12 is rotatable about an actuator axis 16 in the direction indicated by arrow C. The head stack assembly 12 includes a number of actuator arms (18A, 18B, 18C), which extend into respective spaces between the disks 14. While only three actuator arms and disks are shown in FIG. 1, any desired number disks and actuator arms may be provided. The head stack assembly 12 further includes an E-shaped block 19 and a magnetic rotor 20 attached to the block 19 at an opposite position relative to the actuator arms. The rotor 20 cooperates with a stator (not shown) for rotating in an arc about the actuator axis 16. Energizing a coil of the rotor 20 with, for example, a direct current in one polarity causes rotation of the actuator arms about the actuator axis 16, thereby enabling the actuator arms to move across the disks 14.

A head gimbal assembly (HGA) 28 is secured to each of the actuator arms, as shown on actuator arm 18A in FIG. 1. Referring now more particularly to FIG. 2, the HGA 28 includes a suspension 33 and a read/write head 35. The suspension 33 includes a load beam 36 and a flexure 40 to which the read/write head 35 is secured. The read/write head 35 is comprised of a slider 47 secured to the free end of the load beam 36 by the flexure 40. Thus, the read/write element 50 is supported by the slider 47. In the example illustrated in FIG. 2, the read/write element 50 is secured to the trailing end 55 of the slider 47. The slider 47 may also be referred to as a support element since it supports the read/write element 50. The slider 47 can be any conventional or available slider.

In the exemplary device disclosed in the '290 patent, a laser diode 92 is secured to the slider 47 and is positioned over the read/write element 50 for optically coupling to a waveguide which passes through the read/write element. The laser beam propagating through the waveguide core heats a section of the track on the disk under the waveguide, thereby significantly reducing the disk coercivity. The magnetic field from the head at the medium adjacent a write gap is sufficiently large to reorient the domains of the data bits in the section of the track having reduced coercivity from the laser heating, thereby enabling the write element to write data within the track.

Further details regarding the structure and operation of the exemplary heat-assisted device shown in FIGS. 1 and 2 are provided in the '290 patent and, therefore, will not be further described in detail herein. While the heat-assisted device of the '290 patent, and other similar prior art devices, have improved the function of magnetic thin film heads in certain respects, further improvements in the structure and operation of such devices are still desired. Hence, the instant invention was developed in order to provide an improved heat-assisted thin film head for use in a magnetic hard disk drive.

U.S. Pat. No. 5,295,122 entitled "Flying Head of a Magneto-Optical Recording Apparatus" discloses a magneto-optical recording apparatus in which a thin film magneto-optical head is provided separately from the slider. FIGS. 13 and 14 of the '122 patent disclose the use of an optical integrated circuit that is connected to a light source using three optical fibers. One of the optical fibers is used for writing or reading and the other two are for outputting light that has been read. The optical integrated circuit includes branching and connecting circuits that are coupled, using an integrated mirror portion, with a light waveguide path shown in FIG. 14 of the '122 patent. In contrast to the instant invention, which is directed to magnetic recording apparatus, the '122 patent is limited to a magneto-optical recording apparatus. Thus, the '122 patent is not concerned with and does not contemplate heat-assisted writing in a magnetic recording apparatus. Moreover, the overall structure of the magneto-optical head with optical integrated circuit disclosed in the '122 patent has certain disadvantages with respect to the location and configuration of the optical integrated circuit. As a result, the teachings of the '122 patent are not readily adaptable to magnetic recording applications, much less magnetic recording applications that incorporate heat-assisted writing.

SUMMARY OF THE INVENTION

One aspect of the present invention is to satisfy the foregoing need by providing a read/write head having a magnetic reading element of high track density, combined with an improved heat-assisted magnetic write element.

Another aspect of the invention is to provide a magnetic read/write head that incorporates an optical integrated circuit for heat-assisted writing operations.

Another aspect of the invention is to provide an optical integrated circuit for heat-assisted writing having a configuration and orientation that provides certain advantages when incorporated into a magnetic read/write head.

Another aspect of the invention is to provide an optical integrated circuit for heat-assisted magnetic writing having a configuration and orientation that enables the thickness of the magnetic read/write head to be minimized.

A further aspect of the invention is to provide an optical integrated circuit for heat-assisted magnetic writing having a configuration and orientation that does not require the use of mirrors to focus or direct the light used for heat-assisted writing.

In accordance with one embodiment, the invention provides a magnetic read/write head for use with magnetic storage medium, including a write section having an upper pole and lower pole defining a write gap therebetween, and an optical waveguide positioned in the write gap and including a plurality of input sections and a single output section. The input sections are optically coupled to a light beam source such that a plurality of light beams enter the plurality of input sections, respectively. The single output section outputs a light beam that provides thermally assisted writing of data on the magnetic storage medium. The plurality input sections are preferably located at a surface of the read/write head that is opposite to an air bearing surface thereof. This advantageously enables the thickness of the read/write head to be minimized.

In accordance with another embodiment, the invention provides a magnetic read/write head for use with magnetic storage medium, including a write section including an upper pole and lower pole defining a write gap therebetween, and an optical waveguide positioned in the write gap and optically coupled to a light beam source. The optical waveguide outputs a light beam at an air bearing surface of the read/write head to provide heat-assisted writing of data on the magnetic storage medium. The optical waveguide has a waveguide core, and the width of the waveguide core at the air bearing surface is substantially wider than the width of the upper pole at the air bearing surface.

The magnetic read/write head incorporates a laser beam and a waveguide to heat the recording medium in order to lower its coercive force during the write function. The lowered coercive force allows a relatively weak magnetic field to be used to write data in the recording medium which, upon cooling to ambient temperature, becomes magnetically hard and resistant to degradation over time.

Another aspect of the present invention is to integrate an optical waveguide and a magnetic write element in a unique manner, without significantly enlarging the write gap or widening the data track width on the magnetic recording medium. The narrow data track width is preferably defined and controlled by an overlap region of the waveguide and the magnetic gap between the write poles. This results in a narrower data track than either the waveguide or the magnetic gap itself. The integration of the heat-assisted write element can be accomplished by, for example, mounting a heat source, such as a laser or light source on a slider, and by forming an optical waveguide circuit within the magnetic write gap of the write element. The structure is preferably formed using standard wafer fabrication processes. The waveguide directs a laser beam onto a target spot on or within the data storage medium, and is positionally shifted in the cross track direction (i.e., direction generally normal to the track) from the top write pole.

The recording data track width is preferably determined by an overlap region of the waveguide and the top or upper write pole. This overlap region is defined at one end by the magnetic profile of the upper write pole edge, and at another end by the thermal profile of the waveguide edge. In one embodiment, a giant magneto-resistive (GMR) element is used as the read element, and has one edge aligned with the upper write pole edge and the other edge aligned with an edge of the waveguide. The head is capable of recording and reading a longitudinal medium, thereby enabling its use in conventional magnetic disk drives.

The improved read/write head of the invention enables increased density of the magnetic recording medium and improves the servo writing process by reducing normally wasted dead space between tracks. The magnetic read operation provides a significantly better wide band signal-to-noise ratio than the optical read, which enhances the head performance especially at high frequencies. In addition, since the waveguide is aligned relative to the poles during wafer processing, the head requires minimal optical alignment, thereby making the head significantly simpler and less expensive to build as compared conventional read/write heads. Better writing capabilities are achieved at high track densities as compared to conventional magnetic recording systems.

In accordance with another aspect of the invention, the waveguide is provided in the form of an optical circuit having a plurality of inputs, preferably located at the surface of the read/write head that is opposite to the air bearing surface (ABS), and a single output at the ABS for the laser light. The optical circuit includes at least one, and preferably a plurality of combination spots, where two branches of the optical circuit are combined into a single section for concentrating the light. As a result of the structure and orientation of the optical circuit, the optical circuit can extend beyond the back connection of the upper pole and emit a coherent wave to the disk from the ABS. The structure of the waveguide core prevents the light beam from scattering and enables the emitted light beam from the ABS to be as small as a writing bit. The structure of the optical circuit also enables the thickness of the read/write head to be minimized.

In accordance with a further aspect of the invention, a read section of the read/write head includes a magneto-resistive element, and the width of the optical waveguide core at the air bearing surface (ABS) is substantially wider than the width of the upper write pole at the ABS.

These and other features and advantages of the instant invention will be further understood by the following description of various exemplary embodiments of the invention and with reference to the appended drawings, in which:

DETAILED DESCRIPTION OF THE PREFERRED EMBODIMENTS

Figure 1:
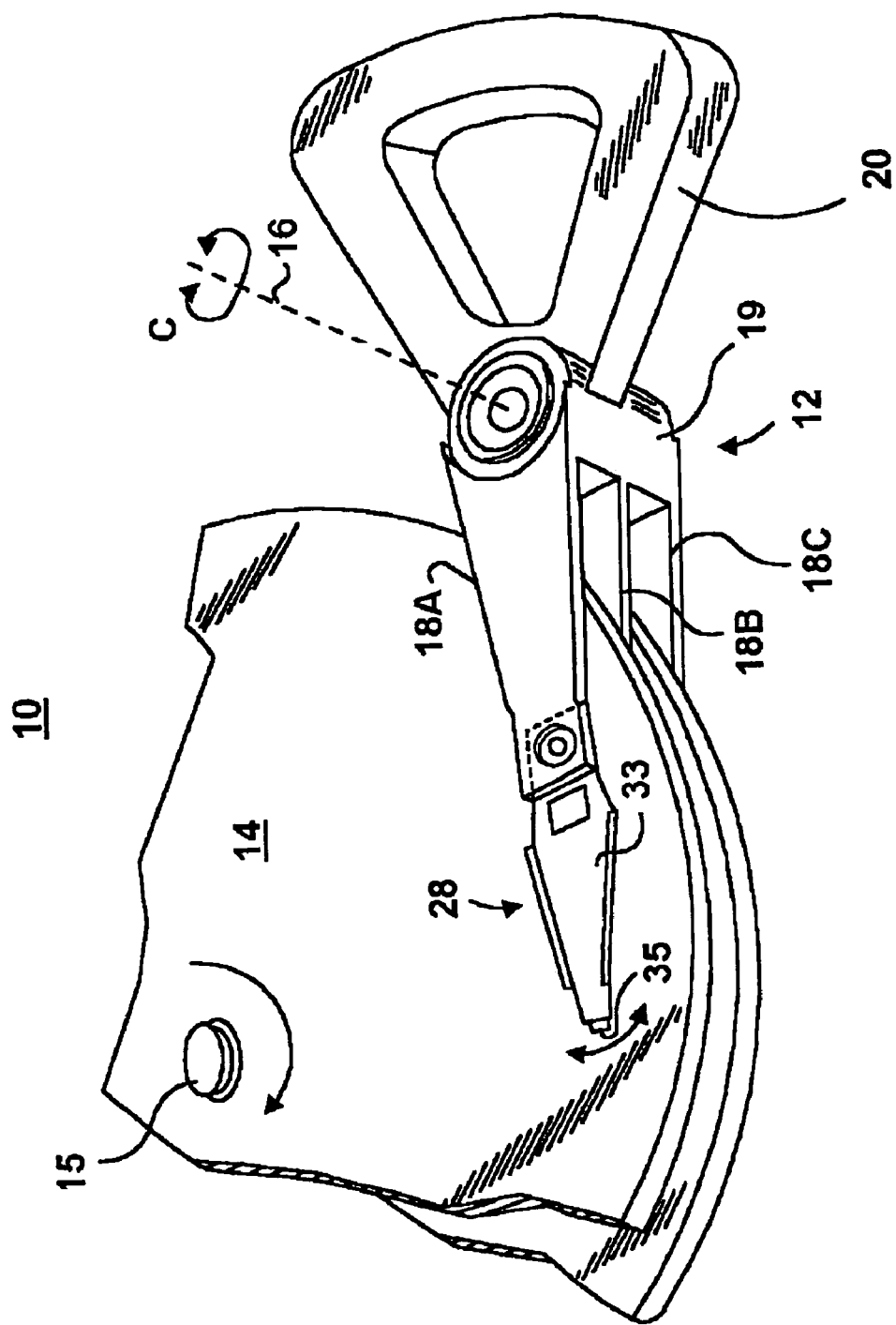
FIG. 1 is a fragmentary perspective view of a data storage system utilizing a read/write head according to the prior art.
Figure 2:
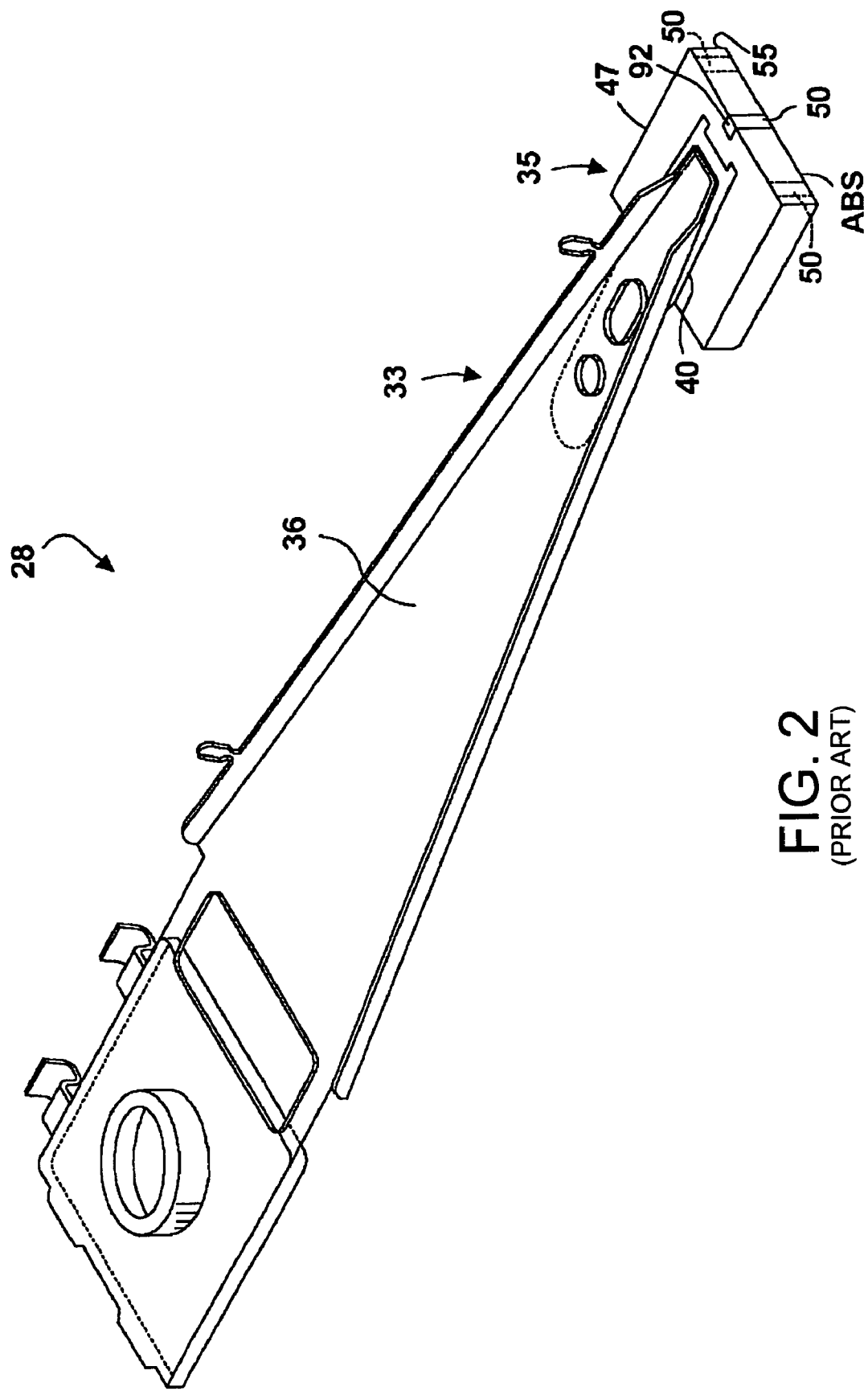
FIG. 2 is an enlarged perspective view of a head gimbal assembly (HGA) used in the prior art data storage system of FIG. 1.

The preferred embodiments of the thin film magnetic head and disk drive device will now be described with reference to the figures. It is noted that the magnetic head 110 of the instant invention can be incorporated into any suitable magnetic storage system, such as a storage system similar to that described above in connection with FIGS. 1 and 2. Due to the fact that the general overall structure of magnetic storage systems are well known, including head stack assemblies and head gimbal assemblies (as illustrated in FIGS. 1 and 2), additional details on these elements are not provided herein. Instead, the following description of the invention will focus on the preferred embodiments of the thin film magnetic head, as it is understood that the head can be incorporated into any suitable magnetic storage system, such as but not limited to, the types shown in FIGS. 1, 2 and 8 herein.

Figure 3:
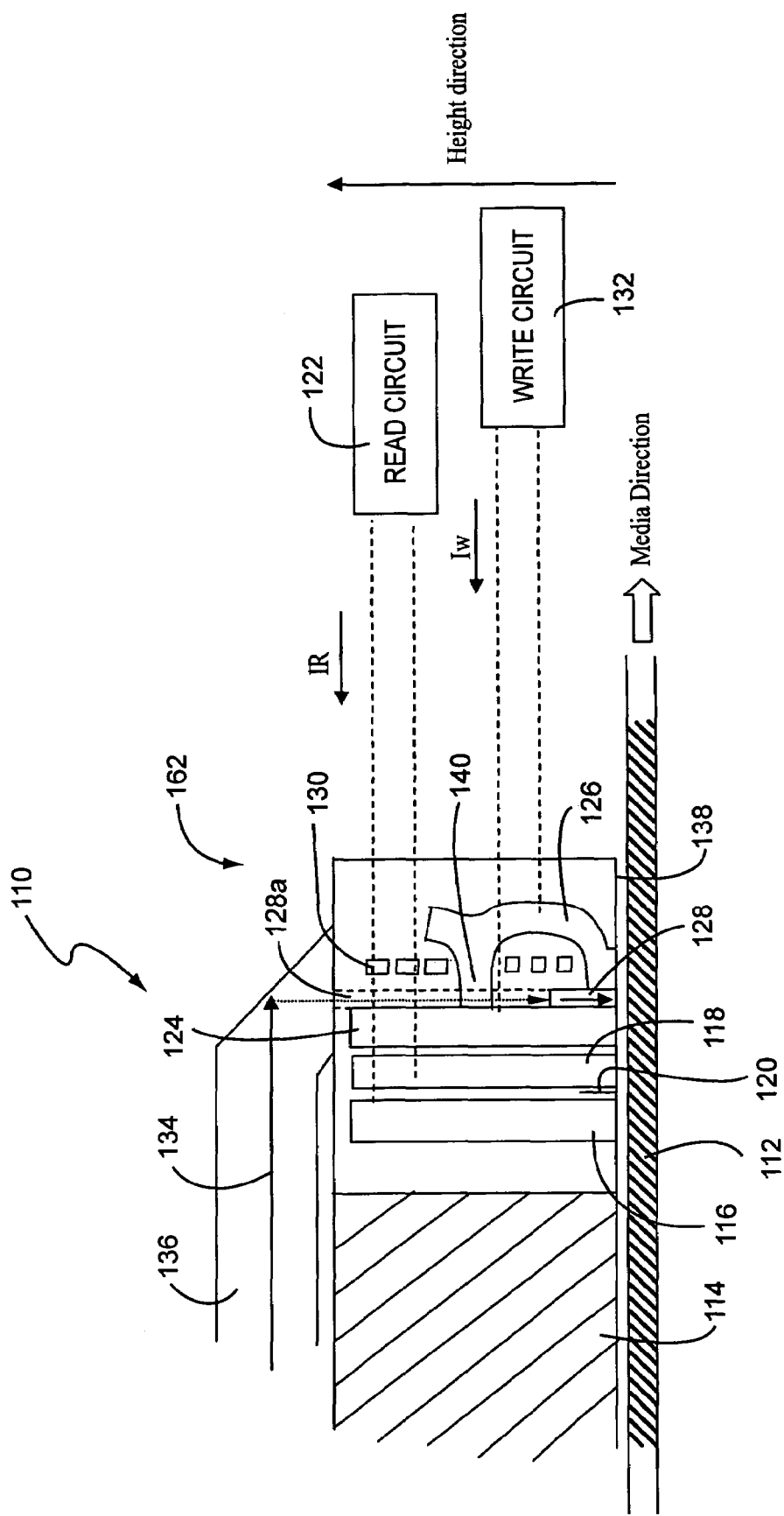
FIG. 3 is a cross-sectional view of a read/write element forming part of a read/write head constructed in accordance with a preferred embodiment of the instant invention, and integrating a heat-assisted write section and a magnetic (GMR) read section.

FIG. 3 shows a thin film magnetic head 110 for use in a magnetic disk drive device and constructed in accordance with a preferred embodiment of the instant invention. As shown in FIG. 3, the head 110 primarily includes a slider 114 and a read/write element 162 that constitutes a hybrid transducer which integrates a thermally assisted magnetic write section and a magnetic read section.

The magnetic read section includes a lower shield layer 116 preferably made of a material that is both magnetically and electrically conductive. For example, the lower shield 116 can have a nickel-iron composition, such as Permalloy, or a ferromagnetic composition with high permeability. The thickness of the lower shield 116 is preferably in the range of approximately 0.5 microns to approximately 14 microns, and more preferably in the range of approximately 1 micron to approximately 4 microns.

The magnetic read section includes a read element 120 formed within a read gap defined between the lower shield 116 and an upper shield 118. In this exemplary embodiment, the read section incorporates a giant magnetoresistive (GMR) element. An insulating layer 164, which is preferably made of aluminum oxide or silicon nitride, for example, is formed within the read gap, over substantially the entire length of the read element 120, but preferably not at the air bearing surface (ABS) 138 of the read element 120.

The giant magnetoresistive (GMR) read element 120 can be formed, for example, by depositing a plurality of alternating ultra-thin layers of magnetically conductive and nonconductive materials, such as Permalloy (Ni 80 Fe20) and copper (Cu), each layer being approximately 10 to 30 angstroms thick. The electric resistance of the GMR element 120 fluctuates when exposed to a time-varying magnetic flux.

Figure 4:
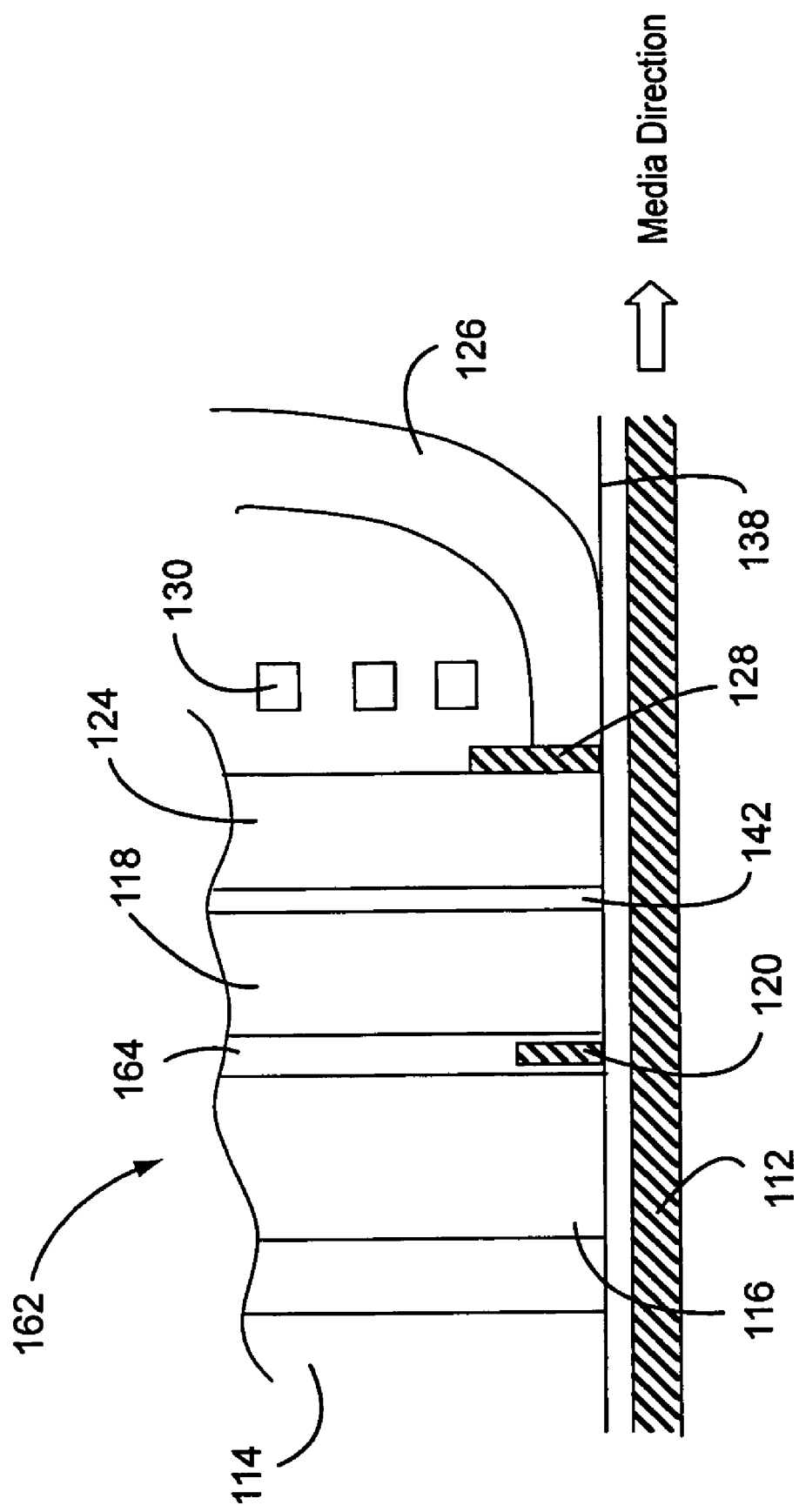
FIG. 4 is an enlarged, partial cross-sectional view of the read/write element of FIG. 3.

The read section also includes an upper shield layer 118, that can be formed over substantially the entire insulating layer 164 (see FIG. 4). Preferably, the upper shield 118 is made of an electrically and magnetically conductive material that can be similar or equivalent to that of the lower shield 116. The thickness of the lower shield 118 can be, optionally but not necessarily, substantially similar or equivalent to that of the lower shield 116. It is noted that the read section is not limited to GMR elements and, instead, can be formed of any other available and suitable magnetic elements, depending on the particular application in which the invention is employed.

A read circuit 122 is connected to the lower shield 116 and the upper shield 118, such that during a read mode the read circuit 122 sends a sensing electric current IR through the GMR element 120. The read-sense current IR flows perpendicularly through the GMR element 120, thus avoiding the along the plane electro-migration problems and magnetic-biasing due to paralleled-current problems associated with some prior art designs based on CIP operation (Current In the Plane mode). In this regard, reference is made to U.S. Pat. No. 5,576,914, which is incorporated herein by reference.

The write section of the read/write head 162 includes a lower pole layer 124, an upper pole layer 126 and a write gap therebetween. In accordance with the invention, an optical waveguide 128 is formed at least partially within the write gap between the lower pole 124 and upper pole 126. A write element is provided that has a pole tip height dimension, referred to as "throat height" ("ABS"), formed by lapping and polishing the pole tip, and a zero throat level where the pole tip of the write head transitions to a back region. A pole tip region (146 in FIG. 5) is defined as the region between the ABS and the zero throat level. Preferably, the optical waveguide 128 includes waveguide cladding (148 in FIG. 5A) that boarders two sides of the waveguide core (152 in FIG. 5A) within the pole tip region 146 and completely surrounds the waveguide core 152 above the pole tip region 146. In the embodiment illustrated in FIG. 3, the lower pole 124 is not the same as the upper shield 118. However, in other embodiments, the lower pole 124 can be the same as the upper shield 118.

The optical waveguide core 152 is preferably formed within the write gap and along substantially the entire length of the lower pole 124. The waveguide core 152 is preferably formed of a material such as TiO2, SiO2 or Al2O3 that has a high optical index of refraction. The waveguide cladding 148 is preferably formed of a material, such as TiO2, SiO2 or Al2O3, with a low index of refraction. A light beam 134 is directed into input ends 128a of the optical waveguide 128 by, for example, the use of a light beam source and an optical fiber 136. The light beam 134 is preferably a laser beam that provides the required energy to heat a target spot on a data layer within the disk 112 to a critical temperature. This heating lowers the coercive force (Hc) of the data layer temporarily in order to assist with erasing and writing data. In one embodiment, the critical temperature is close to the Curie temperature of the data layer. As the critical temperature is approached or reached, the field strength in the data layer magnetic domain is greatly reduced. An external magnetic field is generated by the field in the target domains, as desired, to record a "1" or a "0" data bit. Data is recorded, under control of the write circuit 132, by orienting the magnetization of a spot or domain, directionally, for example in either an up or a down direction. The read element 120 reads the recorded data by measuring the change in the resistance of the GMR element.

FIG. 4 shows an enlarged partial view of the read/write head 162 of FIG. 3, in order to more clearly show the lower shield 116, read element 120, insulating layer 164, upper shield 118, separating layer 142, lower pole 124, optical waveguide 128, coil 130, upper pole 126, air bearing surface (ABS) 138 and disk 112.

Figure 5:
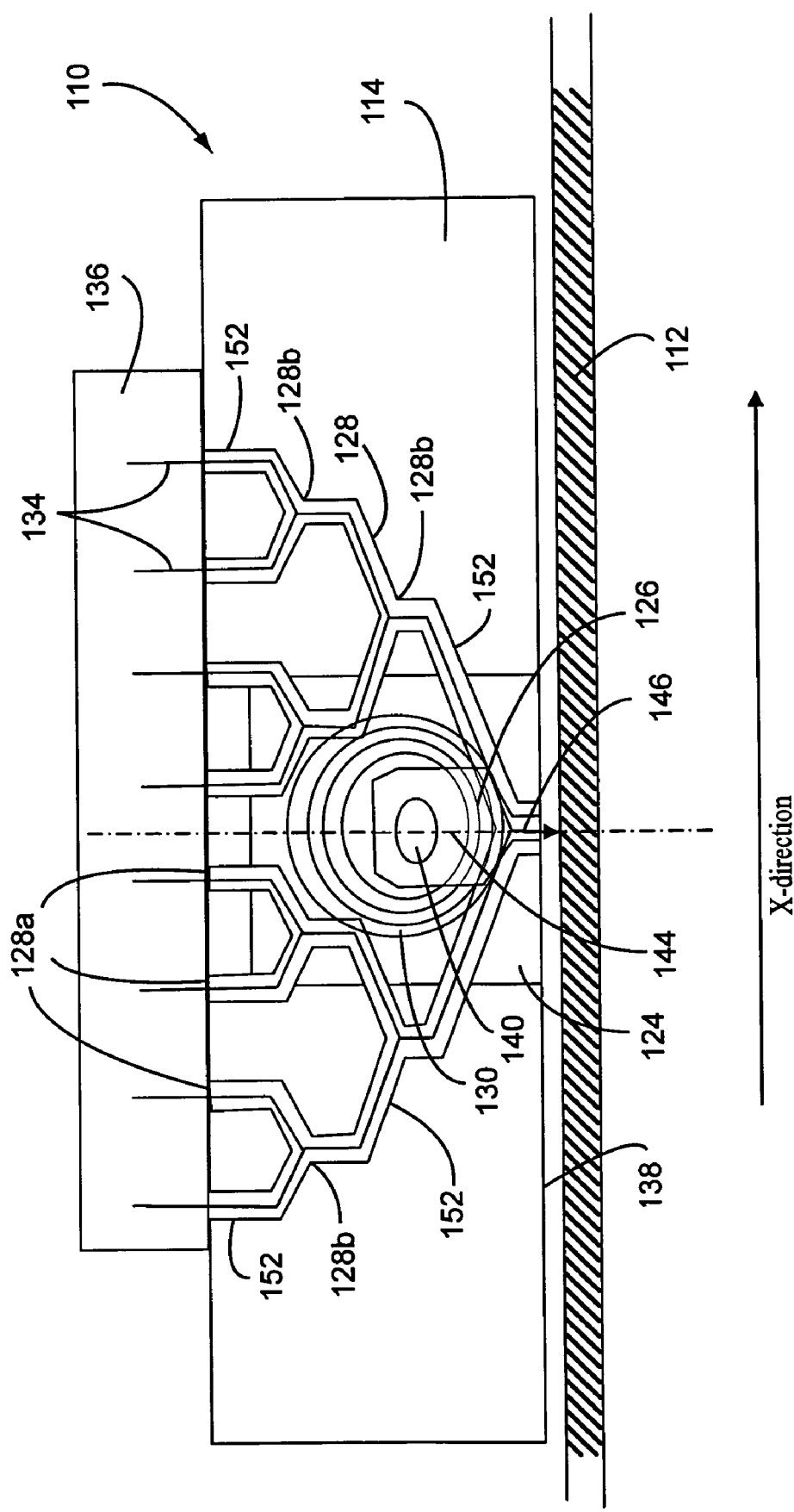
FIG. 5 is a front-view of the read/write element of FIG. 3, illustrating the optical waveguide circuit according to a preferred embodiment of the present invention.
Figure 5A:
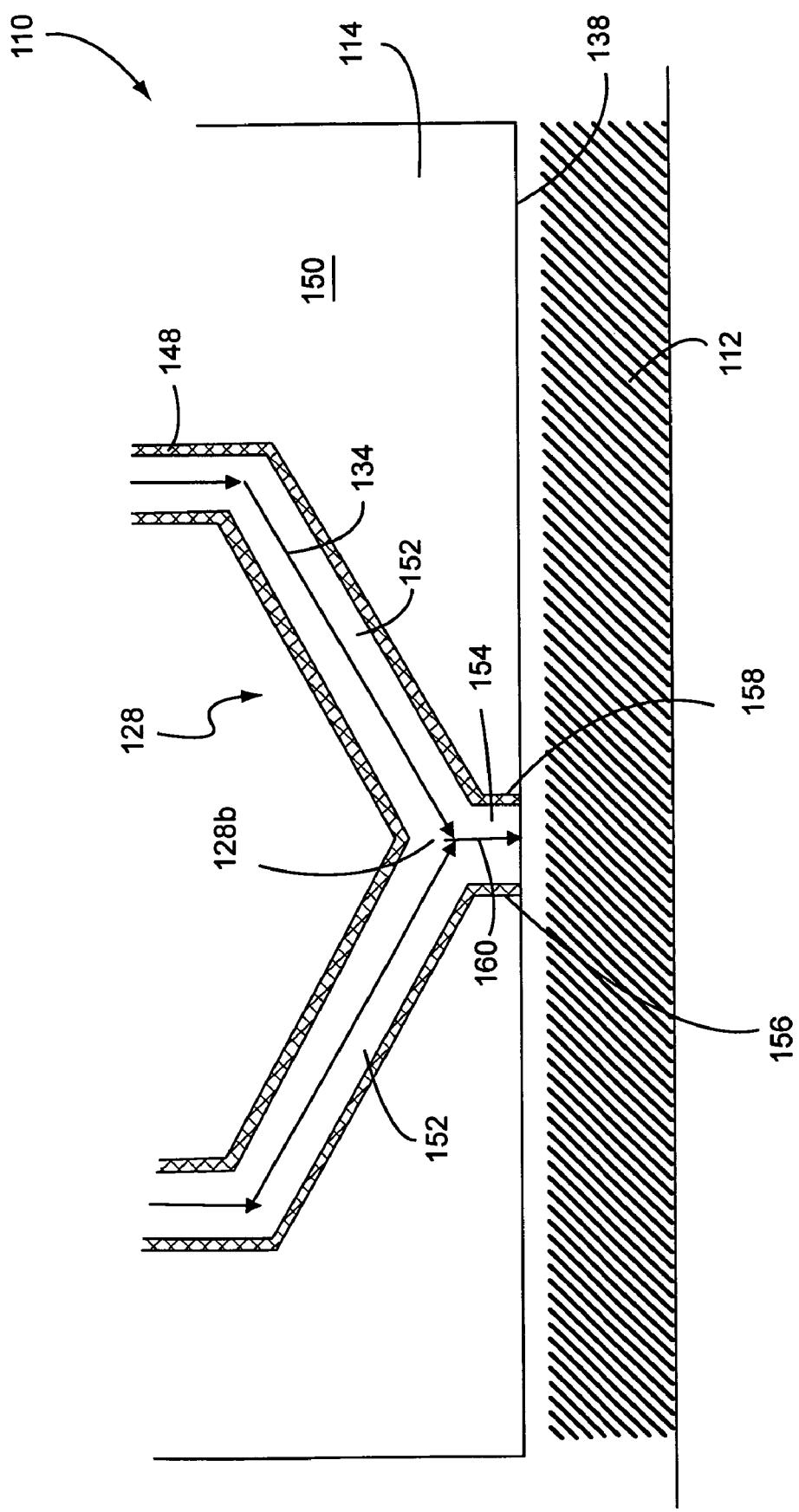
FIG. 5A is an enlarged, partial front-view of the read/write element of FIG. 5.

As shown most clearly in FIG. 5, the optical waveguide 128 preferably has a plurality of waveguide core portions 152 and a plurality of waveguide combination spots 128b at which multiple light beams 134 are combined or concentrated. The optical waveguide 128 also preferably includes a plurality of input ends 128a that each receive a light beam 134 from the light beam source via the optical fiber 136. The plurality of input ends are preferably located at a surface of the read/write head that is opposite to the ABS 138, thereby enabling the thickness of the read/write head to be minimized. Thus, the waveguide 128 defines an optical combiner/splitter. Optical waveguide 128 preferably also includes parallel sides 156 and 158, and its width is substantially constant along the height-direction (See FIG. 5A). FIG. 5A shows an enlarged partial view of the optical waveguide 128 near the ABS 138 and illustrating how the light beams 134 are combined at combination spot 128b to a single light beam 160 for heat-assisted writing at the output end 154 of the optical circuit 128. Element 150 in FIG. 5A represents an overcoat layer.

Figure 6A:
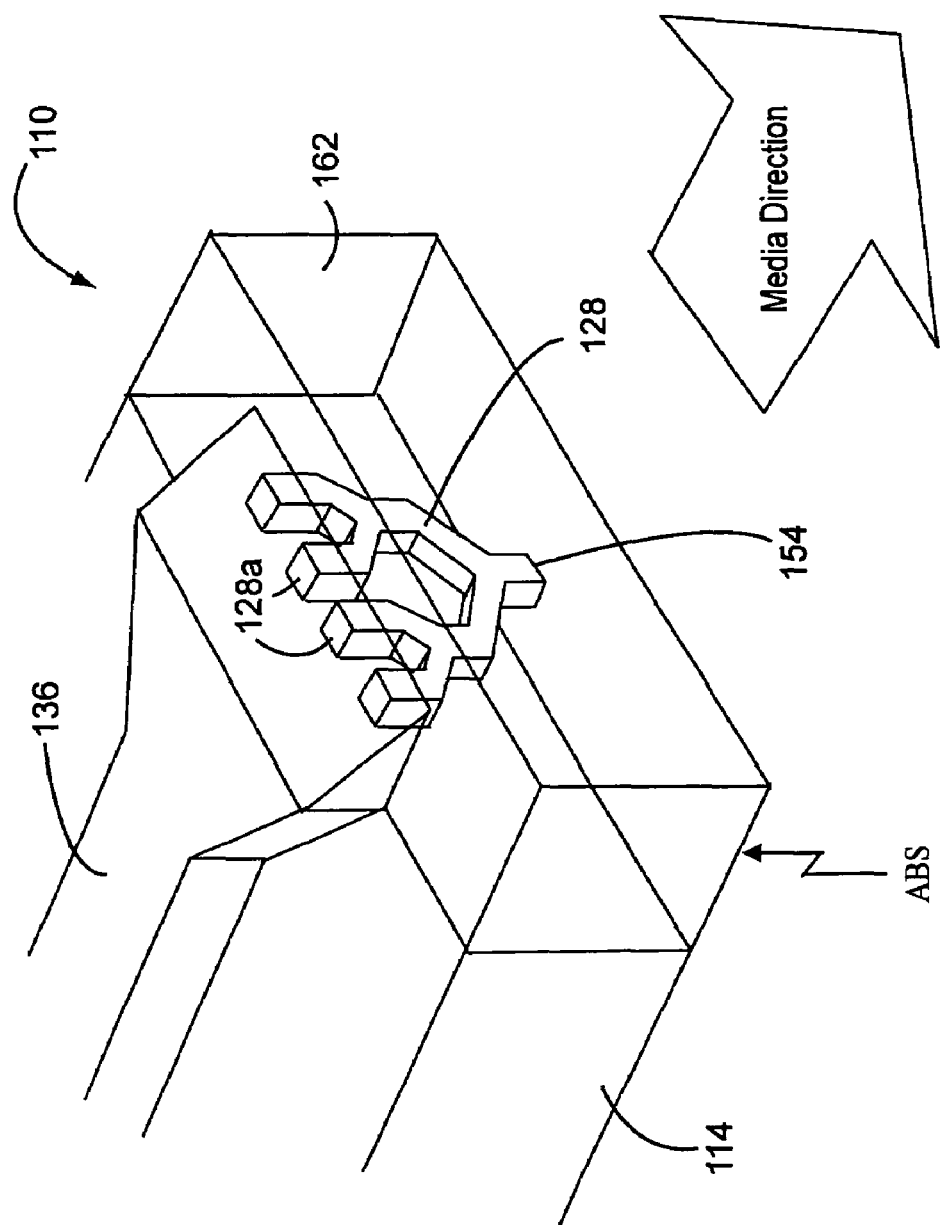
FIG. 6A is a perspective view of the read/write element of FIG. 3 showing the optical waveguide according to the preferred embodiment of the present invention.
Figure 6B:
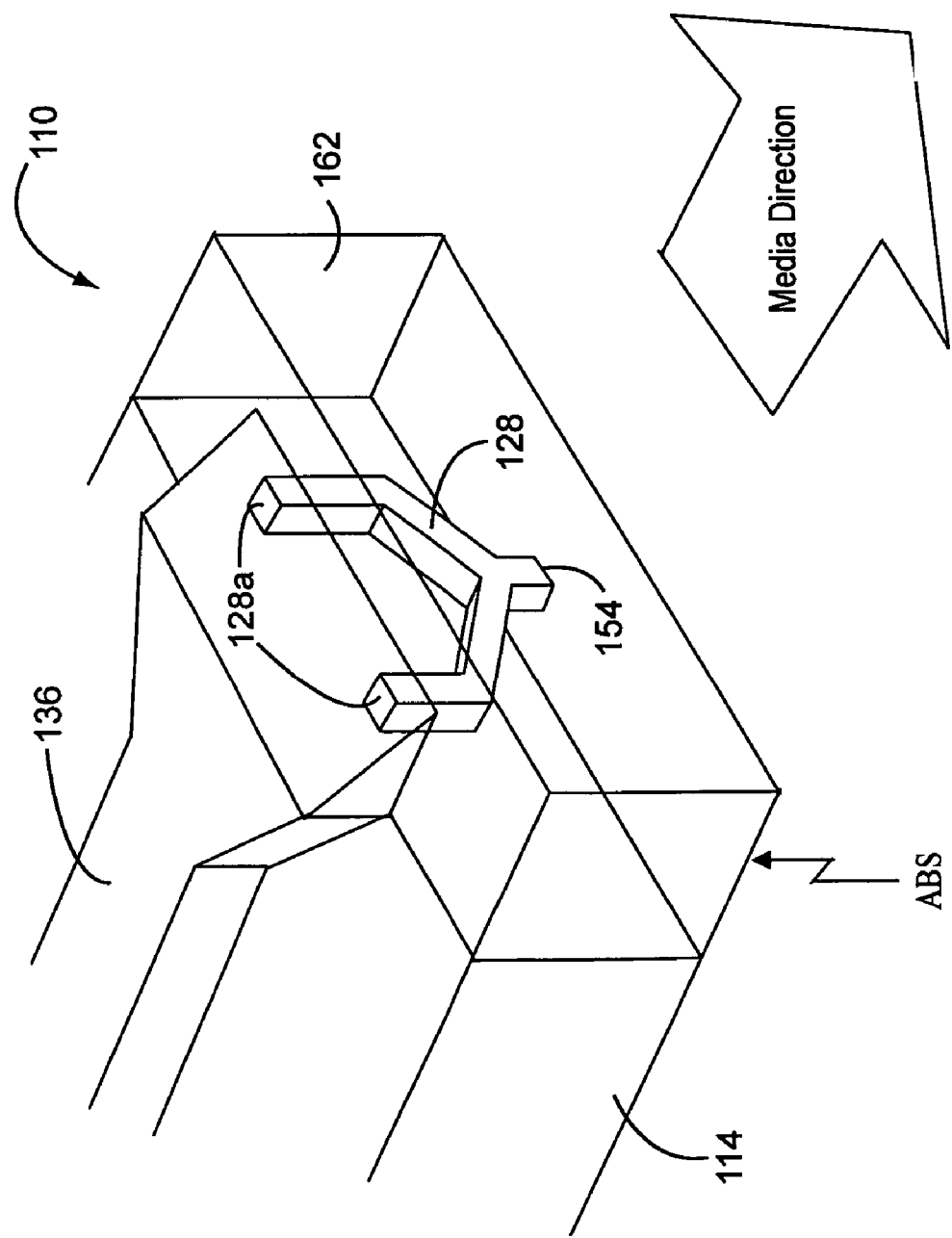
FIG. 6B is a perspective view of a read/write element showing an optical waveguide according to an alternative embodiment of the present invention.

FIG. 6A provides a perspective view of the slider 114 and read/write head 162 of this embodiment, which further illustrates the preferred configuration of the optical circuit 128. The input ends 128a of the optical circuit 128 are preferably enlarged at the location of the optical fiber to facilitate coupling therewith and then have a reduce size to fit within the write gap formed between the upper pole 126 and lower pole 124. FIG. 6B shows an alternative embodiment of the invention, in which the optical circuit 128 includes only two input sections 128a and one output section 154 (i.e., a 2-to-1 waveguide). Thus, in this alternative embodiment, the optical circuit 128 has only a single combination section that combines the light prior to reaching the ABS. In other embodiments, the light from the plurality of input sections can be combined at or near the ABS without the need for a specific combination section. Thus, while the invention involves a plurality of input sections for the heating light, the invention is not limited to any number of combination sections, as long as the light is concentrated from the plurality of input sections at or near the ABS for delivery to the disk in a manner that enables heat-assisted writing. A significant advantage that is achieved by the invention is that the configuration of the optical circuit enables the thickness of the slider (with the head) to be minimized. Another significant advantage is that the configuration of the optical waveguide enables the waveguide to pass or go around the back connection 140 of the upper pole 126 (as seen most clearly in FIG. 5), and emit a coherent wave to the disk 112 from the ABS.

Figure 7:
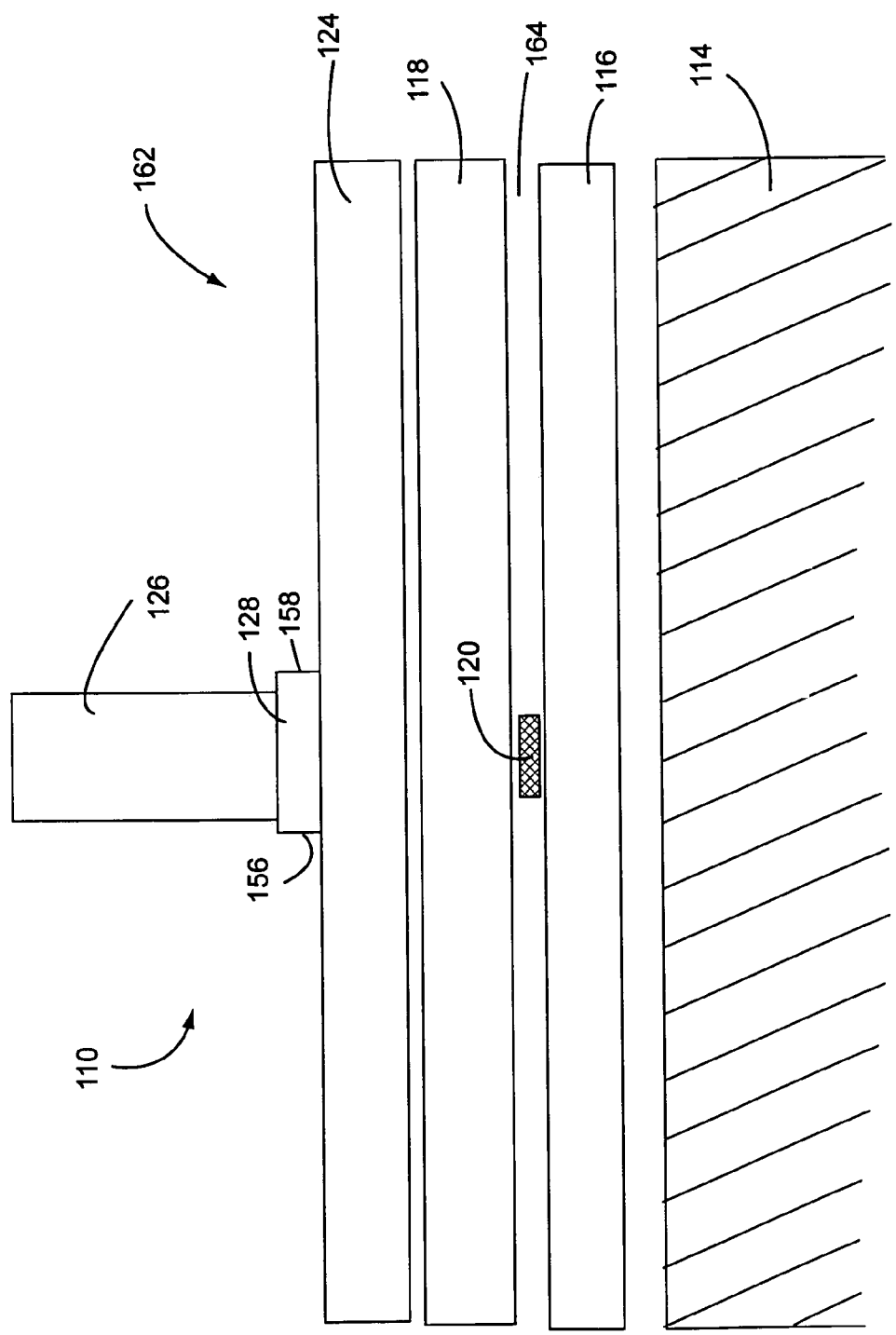
FIG. 7 is an ABS view of the read/write element of FIG. 3.

As shown in FIG. 7, which represent an ABS view of the slider 114 and read/write head 162 of this embodiment, the optical waveguide core 128 has a rectangular cross sectional surface area. The optical waveguide 128 is designed to combine and concentrate the light beams 134 from the input ends 128a in order to provide a sharp-edged heat spot on the disk 112. While the preferred shape and cross-section of the optical waveguide 128 is shown in FIGS. 3-7, other shapes and cross-sectional configurations can be employed (e.g., circular, square, enlongated, etc.).

With reference to FIGS. 5A and 7, the optical waveguide core is defined by two side edges 156 and 158. In a preferred embodiment, the two side edges 156 and 158 are flat and parallel. At or close to the air bearing surface (ABS) 138, the optical waveguide core preferably has substantially the same thickness ("$T_{ABS}$") as the waveguide cladding 148, such that the write gap has a uniform thickness. Preferably, the thickness $T_{ABS}$ can range between approximately 1 micron and approximately 0.02 micron.

With reference to FIGS. 3, 4 and 7, the upper pole layer 126 can be made of an electrically and magnetically conductive material that is similar or equivalent to that of the lower shield layer 116 and the lower pole layer 124. The thickness of the upper pole layer 126 can be substantially the same (or the upper pole layer 126 can optionally be different from) that of the lower shield layer 116. The upper pole layer 126 overlays part of the optical waveguide core and optical waveguide cladding along the throat height region. The upper pole layer 126 includes a pole tip region 146 and a yoke region 144. The pole tip region 146 defines the width at ABS as the writing width of this head. The yoke region 144 is to connect between the lower pole layer 124 and the pole tip region 146 of the upper pole layer 126. In this embodiment, the waveguide core has a width at ABS (OW) that is wider (preferably only a little wider) than the width of the pole tip region 146 of the upper pole layer 126 at ABS.

In operation, the laser beam 134 propagating through the core of the optical waveguide 128 heats a section of the track of the disk 112. The track has a width underneath the optical waveguide 88, and the heating significantly reduces the coercive force of the disk 112. The magnetic field from the read/write head 162 at the medium adjacent the write gap is sufficiently large to reorient the domains of the data bits in the section of the track having reduced coercive force from laser heating, thereby enabling the write element to write data within the track of the disk 112. Only the region of the track 112 under the write gap (the optical waveguide core portion 154) can be overwritten because the magnetic field from the write gap applies only to its underneath region.

The placement of the optical waveguide core portion 152 of the optical waveguide core within the write gap, combined with the extensions 152 of the optical waveguide core, and the location of the wave combination spot 128b (or spots) shown on FIG. 5A beyond the overlap region, presents one of the important aspects of this embodiment of the invention. This design allows the magnetic and thermal gradients to interact concurrently to write data on the track. In other words, as the disk 112 travels in a direction relative to the read/write head, the heat generated on the data track as the laser beam is transmitted through the optical waveguide core, is sufficient to adequately reduce the coercive force of the disk for writing and does not dissipate before the magnetic field is applied.

As has been described above, the optical waveguide core preferably has several optical combiners or combination spots 128b, such as the combinations spot 128b shown in FIG. 5A, that combine the light from waveguide core portions 152 into the output end 154 of the waveguide core. As a result of this structure, the light is concentrated as the light travels from the input ends 128a of the optical circuit 128 to the ABS. Therefore, in accordance with the invention, the waveguide can pass the back connection 140 of the upper pole 126, and emit a coherent wave to the disk 112 from the ABS. Thus, the invention prevents the light beam from scattering and concentrates the light beam from the waveguide core to a point that is as small as the writing bit in the disk 112.

Figure 8:
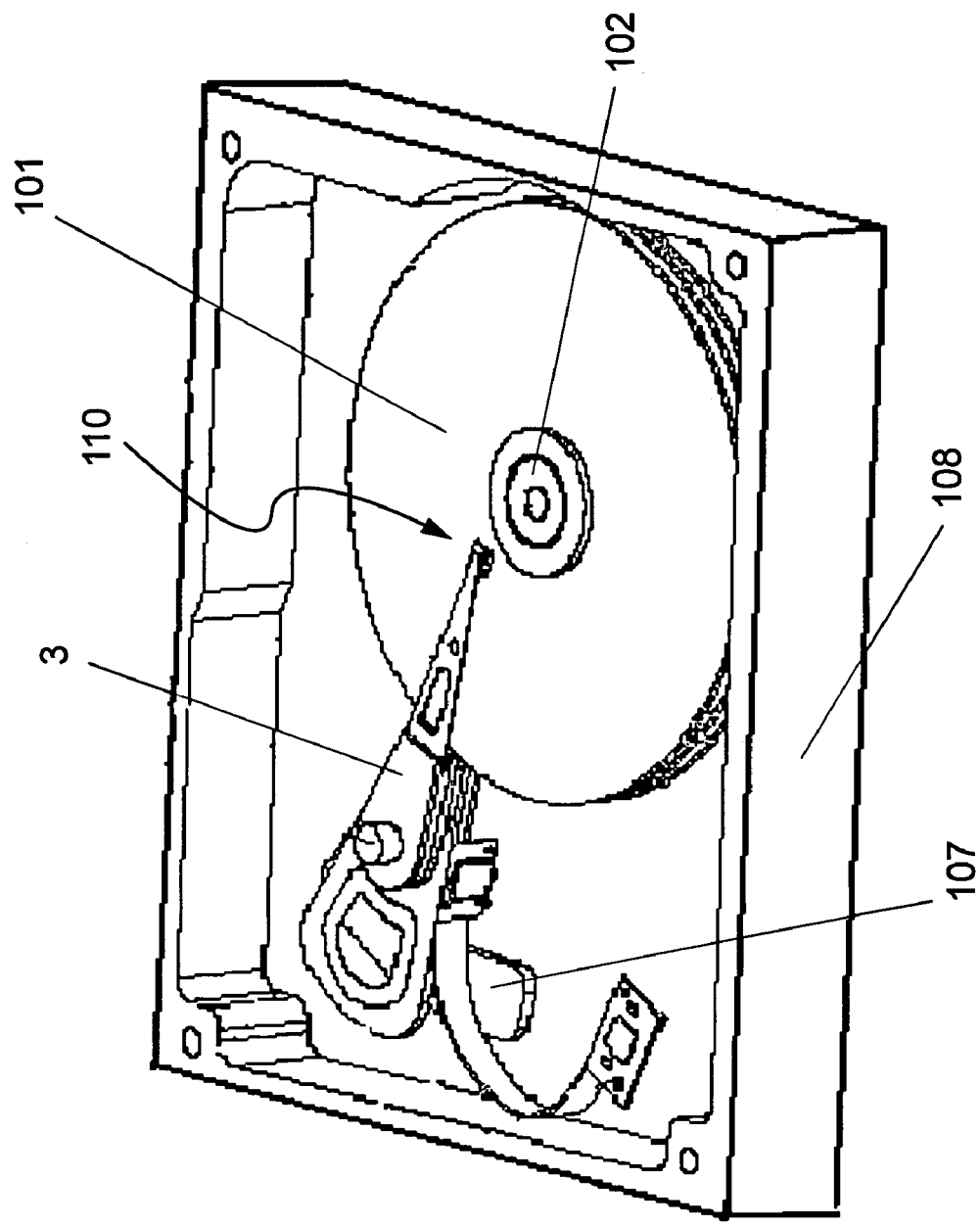
FIG. 8 is a perspective view of an exemplary disk drive unit incorporating an embodiment of the heat-assisted read/write head of the instant invention.

FIG. 8 shows an exemplary disk drive unit (HDD) incorporating the thin film magnetic head 110 of the instant invention. The HDD includes a housing 108, a disk 101, a spindle motor 102, a VCM 107 with an HGA 3 having a heat-assisted read/write head 110 constructed in accordance with the instant invention. Because the structure, operation and assembly processes of disk drive units are well known to persons of ordinary skill in the art, further details regarding the disk drive unit are not provided herein so as not to obscure the invention.

While the preferred forms and embodiments of the invention have been illustrated and described herein, various changes and/or modifications can be made within the scope of the instant invention. Thus, the embodiments described herein are meant to be exemplary only and are not intended to limit the invention to any of the specific features thereof, except to the extent that any of specific features are expressly recited in the appended claims.

What is claimed is:

1. A magnetic read/write head for use with magnetic storage medium, comprising:
    a write section including an upper pole and lower pole defining a write gap therebetween; and
    an optical waveguide positioned in the write gap and including a plurality of combination sections at which certain of a plurality of light beams are combined, a plurality of input sections and a single output section, the input sections being optically coupled to a light beam source such that the plurality of light beams enter the plurality of input sections, respectively;
    wherein the single output section outputs a light beam that provides thermally assisted writing of data on the magnetic storage medium.

2. The magnetic read/write head of claim 1, wherein the plurality input sections are located at a surface of the read/write head that is opposite to an air bearing surface thereof.

3. The magnetic read/write head of claim 1, wherein the optical waveguide has a waveguide core, and the width of the waveguide core at the single output section is substantially wider than the width of the upper pole at an air bearing surface of the read/write head.

4. The magnetic read/write head of claim 1, wherein the light beam is a coherent wave.

5. The magnetic read/write head of claim 1, further including a magnetic read section, having a magneto-resistive element, that is operable to read data from the magnetic storage medium.

6. The magnetic read/write head of claim 5, wherein one edge of the upper pole is substantially aligned with an edge of the magneto-resistive element of the magnetic read section.

7. The magnetic read/write head of claim 1, wherein the input sections of the optical waveguide are coupled to the light beam source using an optical fiber.

8. A disk drive unit, comprising:
    a head gimbal assembly including a magnetic read/write head;
    a drive arm connected to the head gimbal assembly;
    a disk; and
    a spindle motor operable to spin the disk;
    wherein the magnetic read/write head includes:
        a write section including an upper pole and lower pole defining a write gap therebetween; and
        an optical waveguide positioned in the write gap and including a plurality of combination sections at which certain of a plurality of light beams are combined, a plurality of input sections and a single output section, the input sections being optically coupled to a light beam source such that the plurality of light beams enter the plurality of input sections, respectively;
        wherein the single output section outputs a light beam that provides thermally assisted writing of data on the disk.

9. The disk drive unit of claim 8, wherein the plurality of input sections are located at a position on the read/write head that is opposite to an air bearing surface thereof.

10. The disk drive unit of claim 8, wherein the optical waveguide has a waveguide core, and the width of the waveguide core at the single output section is substantially wider than the width of the upper pole at an air bearing surface of the read/write head.

11. The disk drive unit of claim 8, wherein the light beam is a coherent wave.

12. The disk drive unit of claim 8, further including a magnetic read section, having a magneto-resistive element, that is operable to read data from the disk.

13. The disk drive unit of claim 12, wherein one edge of the upper pole is substantially aligned with an edge of the magneto-resistive element of the magnetic read section.

14. The disk drive unit of claim 8, wherein the input sections of the optical waveguide are coupled to the light beam source using an optical fiber.

15. A magnetic read/write head for use with magnetic storage medium, comprising:
    a write section including an upper pole and lower pole defining a write gap therebetween; and
    an optical waveguide positioned in the write gap and optically coupled to a light beam source, wherein the optical waveguide outputs a light beam at an air bearing surface of the read/write head to provide heat-assisted writing of data on the magnetic storage medium;
    wherein the optical waveguide has a plurality of combination sections at which certain of a plurality of light beams are combined and a waveguide core, and the width of the waveguide core at the air bearing surface is substantially wider than the width of the upper pole at the air bearing surface.

16. The magnetic read/write head of claim 15, further including a magnetic read section, having a magneto-resistive element, that is operable to read data from the magnetic storage medium.

17. The magnetic read/write head of claim 16, wherein one edge of the upper pole is substantially aligned with an edge of the magneto-resistive element of the magnetic read section.

18. The magnetic read/write head of claim 15, wherein the light beam is a coherent wave.

19. The magnetic read/write head of claim 15, wherein the optical waveguide includes a plurality of input sections and a single output section, the input sections being optically coupled to the light beam source such that the plurality of light beams enter the plurality of input sections.

20. The magnetic read/write head of claim 19, wherein the plurality of input sections are located at a position on the read/write head that is opposite to the air bearing surface.

21. The magnetic read/write head of claim 19, wherein the input sections of the optical waveguide are coupled to the light beam source using an optical fiber.

22. A disk drive unit, comprising:
- a head gimbal assembly including a read/write head;
- a drive arm connected to the head gimbal assembly;
- a disk; and
- a spindle motor operable to spin the disk;
- wherein the read/write head includes:
  - a write section including an upper pole and lower pole defining a write gap therebetween; and
  - an optical waveguide positioned in the write gap and optically coupled to a light beam source, wherein the optical waveguide outputs a light beam at an air bearing surface of the read/write head to provide heat-assisted writing of data on the disk;
  - wherein the optical waveguide has a plurality of combination sections at which certain of a plurality of light beams are combined and a waveguide core, and the width of the waveguide core at the air bearing surface is substantially wider than the width of the upper pole at the air bearing surface.

23. The disk drive unit of claim 22, further including a magnetic read section, having a magneto-resistive element, that is operable to read data from the disk.

24. The disk drive unit of claim 23, wherein one edge of the upper pole is substantially aligned with an edge of the magneto-resistive element of the magnetic read section.

25. The disk drive of claim 22, wherein the light beam is a coherent wave.

26. The disk drive unit of claim 22, wherein the optical waveguide includes a plurality of input sections and a single output section, the input sections being optically coupled to the light beam source such that the plurality of light beams enter the plurality of input sections.

27. The disk drive unit of claim 26, wherein the plurality of input sections are located at a position on the read/write head that is opposite to the air bearing surface.

28. The disk drive unit of claim 26, wherein the input sections of the optical waveguide are coupled to the light beam source using an optical fiber.

* * * * *